United States Patent [19]

Wilke et al.

[11] 4,080,011
[45] Mar. 21, 1978

[54] LEADSCREW-AND-NUT ASSEMBLY OF THE CIRCULATING-BALL-TYPE

[76] Inventors: Richard Wilke, Am Weissenfeld 4, Schwelm, Germany, 583; Helmut Korthaus, Fernblick 3, Wuppertal-Barmen, Germany, 56

[21] Appl. No.: 729,801

[22] Filed: Oct. 5, 1976

[30] Foreign Application Priority Data

Oct. 7, 1975 Germany .......................... 2544755

[51] Int. Cl.² ................................................ F16H 55/22
[52] U.S. Cl. ..................................... 308/6 C; 74/459; 308/189 R
[58] Field of Search .......... 308/6 R, 6 C, 188, 189 R; 74/459, 424.8 R

[56] References Cited

U.S. PATENT DOCUMENTS

| | | | |
|---|---|---|---|
| 1,821,873 | 9/1931 | Best ................................ | 308/189 R |
| 2,674,899 | 4/1954 | Gobereau ........................ | 74/459 |
| 2,675,712 | 4/1954 | Speth .............................. | 74/459 |
| 3,003,361 | 10/1961 | Boutwell ........................ | 308/189 R |
| 3,214,993 | 11/1965 | Teramachi ...................... | 74/459 |
| 3,244,022 | 4/1966 | Wysong, Jr. ................... | 74/459 |
| 3,592,072 | 7/1971 | Nilsson .......................... | 74/459 |
| 3,851,541 | 12/1974 | Ploss et al. .................... | 74/459 |

*Primary Examiner*—Trygve M. Blix
*Assistant Examiner*—Stuart M. Goldstein
*Attorney, Agent, or Firm*—Montague & Ross

[57] ABSTRACT

A leadscrew and a coacting nut are provided with shallow helical grooves forming a track for a set of balls whose radius exceeds the combined depth of the grooves. The groove bottoms are of arcuate cross-section, with a radius of curvature slightly exceeding the ball radius, and are machined in a hardened zone of the leadscrew and the nut, respectively.

10 Claims, 4 Drawing Figures

LEADSCREW-AND-NUT ASSEMBLY OF THE CIRCULATING-BALL-TYPE

FIELD OF THE INVENTION

Our present invention relates to a load-driving assembly comprising a leadscrew or spindle coaxially surrounded by a coacting nut which can be axially reciprocated by rotation of the leadscrew in alternately opposite directions.

BACKGROUND OF THE INVENTION

In our prior U.S. Pat. No. 3,942,846 there has been disclosed an assembly of this type in which the two relatively rotatable members, i.e. the leadscrew and the nut, are separated by a set of identical bearing balls recirculated via an endless track. The track is formed by aligned helical guide grooves on the confronting surfaces of the two members and by a return channel of greater depth in the body of the nut. The grooves have a depth equal to almost half the ball diameter and a width slightly smaller than that diameter whereby the balls are supported along bearing lines spaced from the groove bottoms. Such a two-point support, with positive guidance of the balls, can also be had with grooves of triangular, trapezoidal or ogival rather than arcuate cross-section. For a long service life with maintenance of the groove profile and pitch it is necessary that the members be made of steel which is hardened from their confronting surfaces down to at least the groove bottoms.

In the conventional manufacture of such a leadscrew, a correspondingly dimensioned steel rod is placed on a lathe in an unhardened state for the cutting of its track-forming guide groove. Since the subsequent hardening of the grooved rod invariably results in some deformation, the groove-cutting step is preceded by a trail run in which a substantially identical workpiece is machined and hardened to determine the extent of that deformation so that allowance can be made therefor in determining the pitch of the actual guide groove. Thereafter, the grooved rod is subjected to a hardening process, followed by tempering, cleansing and testing. Generally, the hardened leadscrew then requires some straightening and deburring as well as final grinding and honing of the groove profile.

The discontinuous surface of the grooved leadscrew creates some problems in the hardening step inasmuch as thermal stresses may produce cracks or weak spots. Also, uneven hardening due to temperature differences at the various levels may result in a creeping deformation of the workpiece so that the desired precision of the groove, profile and pitch cannot be achieved.

Similar inconveniences occur in the machining of the nut, albeit to a lesser degree in view of the reduced axial length of this member.

OBJECT OF THE INVENTION

The object of our present invention, therefore, is to provide a load-driving assembly of the character referred to which obviates the aforestated drawbacks and can be produced in a relatively simple manner with a high degree of precision, with elimination of the aforementioned trial run and of the need for a calculated predistortion of the pitch.

SUMMARY OF THE INVENTION

We realize this object in accordance with our present invention, by replacing the conventional groove profile with one known per se from thrust or journal bearings in which the balls are constrained to move along annular rather than helical tracks. Thus, we provide the leadscrew and the nut with relatively shallow grooves whose concave bottoms have a substantially arcuate cross-section with a radius of curvature slightly exceeding the ball radius, the combined depth of the grooves in the leadscrew and nut members being less than the ball radius. These grooves are machined in hardened portions of the respective members whose depth exceeds that of the grooves.

A leadscrew for such an assembly can be made by case-hardening a steel rod to a depth exceeding a predetermined value equal to a fraction of the ball diameter and forming in the hardened surface portion of the rod a helical groove with a depth equaling that value and with a bottom of arcuate cross-section whose radius of curvature exceeds half the ball diameter.

The coacting nut can be produced in an analogous manner, except that this member may be hardened — prior to the cutting of the groove — throughout its full depth if its wall thickness is small. In general, that wall thickness (as measured between turns of its groove) should be at least equal to the ball diameter. Thin-walled nuts can be reinforced with the aid of a surrounding housing.

We have found that our improved assembly, despite the shallowness of its grooves, affords precise guidance to the nut in its axial reciprocation along the leadscrew or spindle if the groove depth ranges between about one seventh and one fourth of the ball diameter. Since the groove of the nut generally experiences considerably more wear than that of the leadscrew, owing to the difference in axial length, we prefer to make the former groove deeper than the latter.

The machining of such shallow grooves in the hardened surface zones of the leadscrew and nut members does not create major problems, especially if the grooves are formed by a grinding process.

The hardening may be carried out by flame or induction heating, for example; we prefer to obtain a Rockwell hardness of about 62 – 64 RHC at the confronting surfaces of the two coaxial members.

BRIEF DESCRIPTION OF THE DRAWING

The above and other features of our invention will now be described in detail with reference to the accompanying drawing in which.

SPECIFIC DESCRIPTION

Figure 1:
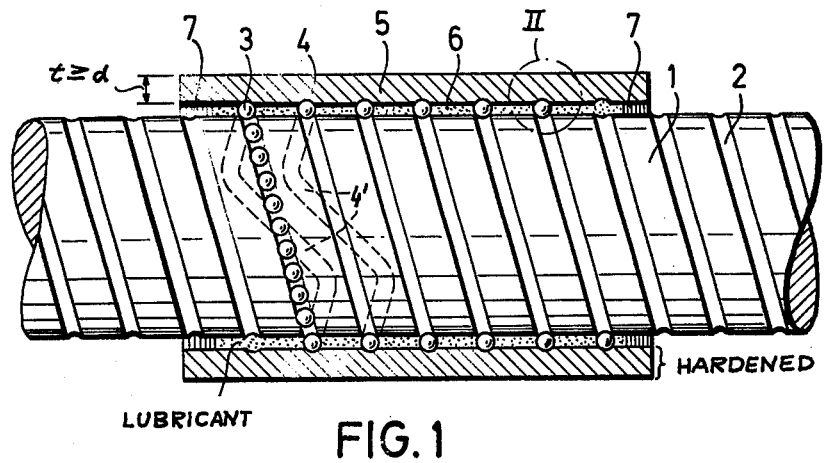
FIG. 1 shows, partly in axial section, a load-driving assembly according to our invention.
Figure 2:
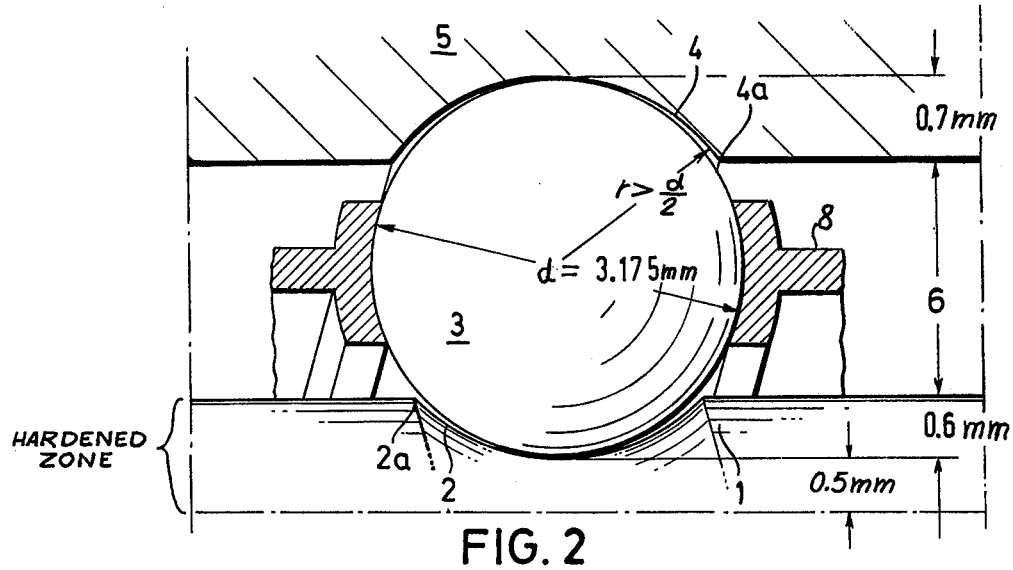
FIG. 2 is a detail view, drawn to a larger scale, of the area II indicated in FIG. 1.

The assembly shown in FIGS. 1 and 2 comprises a leadscrew or spindle 1 with a helical groove 2 coaxially surrounded by a nut 5 also having a helical groove 4, the two grooves 2, 4 being aligned with each other to form guide tracks for the continuous recirculation of a set of bearing balls 3 illustrated only in part. Each track encompasses a major part of a turn of groove 2, a corresponding part of a turn of groove 4 and a return channel 4' (only two of which have been illustrated in dotted lines) which crosses the first-mentioned turn and may form part of an insert in the nut body as described in our aforementioned prior U.S. Pat. No. 3,942,846. It will be apparent that a single return channel may be provided for several or possibly all the turns of groove 4, thereby reducing the number of parallel guide tracks.

Members 1 and 5 are separated by an annular clearance 6 whose radial width is greater than the ball radius and which, according to an advantageous feature of our invention, can be occupied by a lubricant such as molybdenum disulfide. The lubricant is held in place by flexible annular wipers 7 secured to the inner peripheral surface of nut 5 at opposite ends thereof. Clearance 6 may also accommodate a ball cage 8 (FIG. 2) of conventional structure.

As best seen in FIG. 2, each groove 2, 4 has an arcuate bottom with a radius of curvature $r$ which is slightly larger than the radius of balls 3, i.e. $d/2$ where $d$ is the ball diameter which in the present instance equals 3.175 mm. The groove 2 of the leadscrew and the groove 4 of the nut have a depth of 0.6 mm and 0.7 mm or approximately $d/5$ and $2d/9$, respectively, both values thus lying between $d/4$ and $d/7$. The sum of these depths is 1.3 mm and is thus less than the ball radius. If the length of screw 1 greatly exceeds that of nut 5, the depth of groove 4 may be increased to about 0.8 mm to compensate for the more intense wear.

The two grooves lie in hardened portions of members 1 and 5, their hardness at the groove edges 2a and 4a as well as along the groove bottoms being about 62 – 64 RHC. The hardened zone of leadscrew 1 extends to a depth of 1.1 mm, thus exceeding the depth of groove 2 by half a millimeter. Nut 5 is hardened throughout its wall thickness $t$ which equals or exceeds the ball diameter $d$. The groove surfaces should be honed to a roughness of about 1 micron or less.

Figure 3:
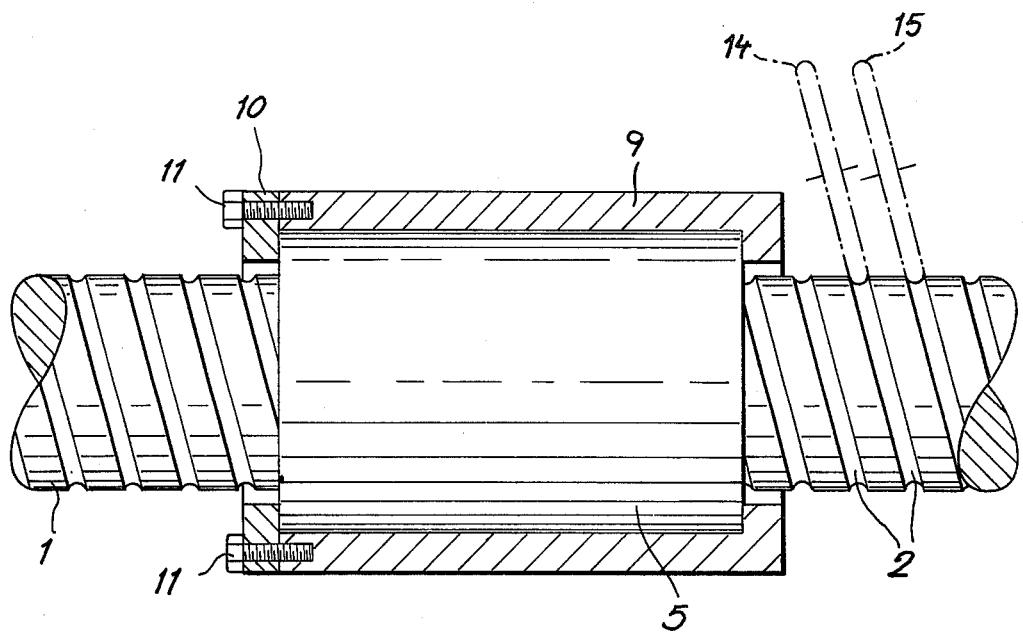
FIG. 3 is a side view of the assembly of FIG. 1 provided with a nut housing.
Figure 4:
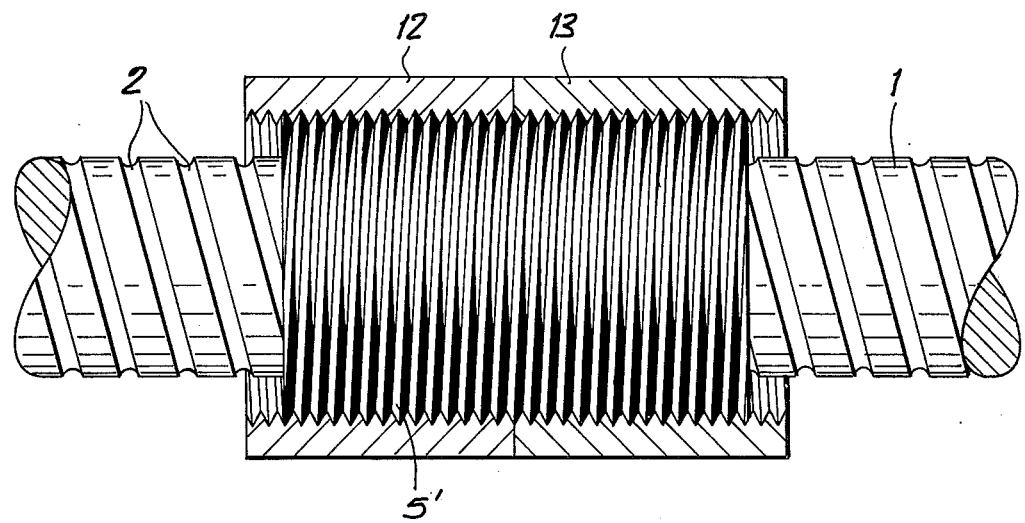
FIG. 4 is a view similar to FIG. 3, illustrating a modification.

As shown in FIG. 3, the nut 5 can be encased in a housing formed of a shell 9 and an end ring 10 which are held together by screws 11. Alternatively, as illustrated in FIG. 4, a nut 5' may have an externally threaded surface engaged by two reinforcing nuts 12, 13 which are axially stressed against each other and form an external housing; the adjustability of this stress allows for the elimination of residual pitch deviations.

The curvature of the groove bottoms need not be circular but could also be parabolical, for example, so as to osculate the great circle of the balls 3. In fact, such an osculating shape may establish itself automatically upon prolonged use as the balls deviate slightly from their centered positions. We have found that this lateral mobility of the balls substantially reduces the frictional resistance of the assembly as compared with systems in which the balls are positively guided.

The ability of our improved leadscrew-and-nut assembly to transmit considerable load-driving forces despite the shallowness of its guide grooves is a surprising effect which could not have been expected from experiences with conventional thrust or journal bearings using such grooves.

The machining of the grooves by high-speed grinding wheels 14, 15 in the more slowly turning and advancing spindle or nut, as diagrammatically illustrated in FIG. 3, is relatively simple since the wheels need not penetrate deeply into the hardened surface zones. Naturally, each groove could consist of a single helix, rather than two (or more) interleaved helices as shown.

We claim:

1. A load-driving assembly comprising a leadscrew member, a nut member coaxially surrounding said leadscrew member, and a set of substantially identical bearing balls interposed between said members; said leadscrew member and said nut member being respectively provided with a first and a second helical groove forming part of at least one endless track for the continuous recirculation of said balls upon relative rotation of said members, said grooves having concave bottoms of substantially arcuate cross-section with a radius of curvature slightly exceeding the ball radius, the depth of each of said grooves ranging between substantially, one-seventh and one-fourth of the ball diameter, said members consisting of steel hardened along their grooved surfaces to a depth exceeding that of said grooves with a surface hardness of substantially 62–64 RHC, said leadscrew member being hardened throughout a zone whose depth is on the order of twice its groove depth.

2. An assembly as defined in claim 1 wherein the depth of said second groove exceeds the depth of said first groove.

3. An assembly as defined in claim 1 wherein said members are separated by an annular clearance filled with lubricant.

4. An assembly as defined in claim 3 wherein said nut member has opposite ends provided with annular wipers substantially closing said clearance.

5. An assembly as defined in claim 1 wherein the wall thickness of said nut member between turns of said second groove is at least equal to the ball diameter.

6. An assembly as defined in claim 5 wherein said nut member is hardened throughout its wall thickness and is provided with an external reinforcing housing.

7. A load-driving assembly comprising a leadscrew member, a nut member coaxially surrounding said leadscrew member, and a set of substantially identical bearing balls interposed between said members; said leadscrew member and said nut member being respectively provided with a first and a second helical groove forming part of at least one endless track for the continuous recirculation of said balls upon relative rotation of said members, said grooves having concave bottoms of substantially arcuate cross-section with a radius of curvature slightly exceeding the ball radius, the combined depth of said grooves being less than the ball radius, said members consisting of steel hardened along their grooved surfaces to a depth exceeding that of said grooves, said members being separated by an annular clearance of a width greater than the ball radius, said clearance being occupied only by said balls and by a lubricant.

8. An assembly as defined in claim 7 wherein the depth of said second groove exceeds the depth of said first groove.

9. An assembly as defined in claim 8 wherein said members have a hardness of substantially 62 – 64 RHC at their grooved surfaces.

10. An assembly as defined in claim 8 wherein the depth of each groove ranges between substantially one seventh and one fourth of the ball diameter.

* * * * *